United States Patent [19]

Bruch et al.

[11] Patent Number: 4,805,978
[45] Date of Patent: Feb. 21, 1989

[54] DEVICE HAVING A LIGHT WAVEGUIDE PLUG CONNECTOR

[75] Inventors: Helmut Bruch, Berlin; Peter Pohl, Krailling, both of Fed. Rep. of Germany

[73] Assignee: Siemens Aktiengesellschaft, Berlin and Munich, Fed. Rep. of Germany

[21] Appl. No.: 77,640

[22] Filed: Jul. 24, 1987

[30] Foreign Application Priority Data

Jul. 29, 1986 [DE] Fed. Rep. of Germany ....... 8620245

[51] Int. Cl.$^4$ .................................................. G02B 6/36
[52] U.S. Cl. ..................................................... 350/96.20
[58] Field of Search ................ 350/96.20, 96.21, 96.22

[56] References Cited

U.S. PATENT DOCUMENTS

| 1,531,917 | 3/1925 | French | 439/247 |
|---|---|---|---|
| 4,445,753 | 5/1984 | Collignon | 350/96.21 |
| 4,614,402 | 9/1986 | Caron et al. | 350/96.21 |
| 4,687,291 | 8/1987 | Stape et al. | 350/96.21 |
| 4,726,647 | 2/1988 | Kakii et al. | 350/96.21 |
| 4,735,480 | 4/1988 | Levinson et al. | 350/96.21 |
| 4,735,482 | 4/1988 | Yoshida et al. | 350/96.20 |

FOREIGN PATENT DOCUMENTS

| 0034987 | 9/1981 | European Pat. Off. . |
| 2330664 | 1/1975 | Fed. Rep. of Germany . |
| 7535713 | 3/1976 | Fed. Rep. of Germany . |
| 2084345 | 4/1982 | United Kingdom . |

Primary Examiner—William L. Sikes
Assistant Examiner—Frank González

[57] ABSTRACT

A device or appliance comprising a light waveguide plug connector is composed of a pin seated resiliently and with play in a socket. Both the pin and socket have cylindrical portions and conical end portions, one of the pins and socket has an intermediate tapering portion with a taper substantially less than the taper of the conical end portion. The slightly tapered intermediate portion will facilitate the plugging in of the pin into the socket, even given a radial offset of the axis of the socket and the pin to each other.

11 Claims, 1 Drawing Sheet

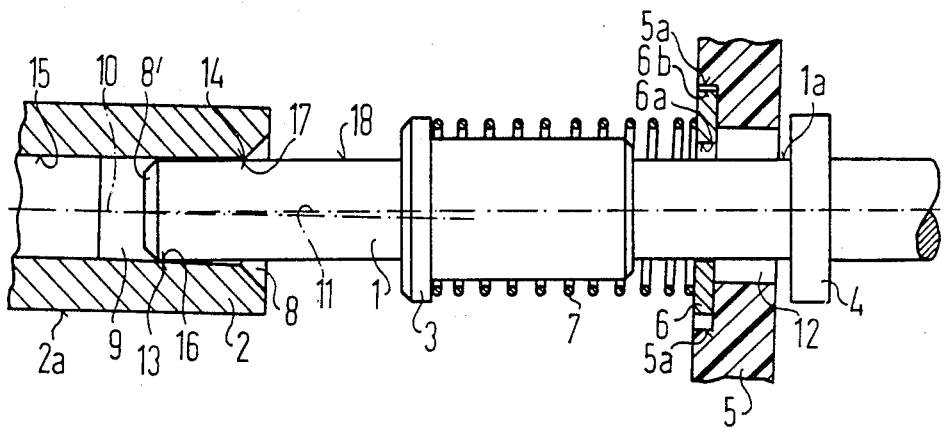

DEVICE HAVING A LIGHT WAVEGUIDE PLUG CONNECTOR

BACKGROUND OF THE INVENTION

The present invention is directed to an appliance or device containing at least one light waveguide plug connector which has one part of the connector which is fashioned as a pin-like part, while the other is fashioned as a socket-like part. Both parts have cylindrical sections mated to one another and the two parts can be plugged into one another. At least one of the two parts can be radially seated with play and axially seated under a spring effect.

A device or appliance, which has a light waveguide plug connector composed of a pin part which is seated in longitudinally mobile fashion by means of a spring and which can be inserted into a socket-shaped part, is disclosed in German Gebrauchsmuster No. 75 35 713. A connection between the two light waveguides is produced in such a connector. The pin-shaped part is also seated in a transversely mobile fashion in order to compensate for tolerances which can occur between the light waveguide plug connector and, for example, an additional plug connector of the same device or appliance. Lateral offset of the pin-shaped part with respect to the socket-shaped part, however, can lead to an oblique positioning of the pin-shaped part because the transverse mobility of the pin-shaped part is affected by friction due to the spring. Upon insertion of the pin-shaped part into the socket-shaped part, difficulties can thereby arise when the cylindrical section of the two parts to be plugged into one another have very small tolerances with respect to one another.

SUMMARY OF THE INVENTION

It is an object of the present invention to improve a device or appliance having light waveguide plug connectors wherein the plug-in of the pin-shaped part into the socket-shaped part is possible without impediment.

To obtain these objects, the present invention is directed to an improvement in a device containing at least one light waveguide connector having a pin-shaped part and a socket-shaped part, at least one of the two parts being mounted on a wall member for radial movement and means for axially biasing the two parts together, and both parts having cylindrical sections mated to one another when the parts are plugged into one another. The improvements are that at least one of the parts has a conical end section spaced by a tapering intermediate section from a cylindrical portion of the part, said tapering intermediate section being provided with less of a taper in comparison to that of the conical end section.

One of the advantages of the present invention is that the additional outside guide sleeve which is in the above-mentioned Gebrauchsmuster can be omitted.

Within the framework of the invention, it can also be provided that a helical compression spring for generating the spring power is supported against a ring lying against a wall, one of the two parts extending through a bore in the wall and also a bore in the ring, with the bore in the ring and the wall being larger than the diameter of the one part extending therethrough to provide lateral play.

Over and above this, the invention provides the radial play with which one of the two parts is mounted and this play is divided into two halves with one half being the play between the inside diameter of the ring and the outside diameter of the corresponding part, and the other half of the play being between the outside diameter of the ring and a limiting part, which restricts the play in the movement of the ring. This limiting part is connected to the housing wall and preferably is a recess receiving the ring.

In this way, for example, the pin-shaped part can place itself at a slant in order to compensate for axial offset between the two parts without thereby having to overcome a sliding friction between the ring and the wall.

It is provided as another design feature of the invention that the tapering intermediate section comprises a slant of less than 1° and that both parts are composed of a material selected from a group consisting of hard metal, ceramic and other materials having similar material properties.

A further development of the invention provides that the intermediate section is only present in the socket-shaped part. It is also advantageous that one or more plug connectors can be arranged together in a common mount with one or more electrical plug connectors.

Other advantages and features will be readily apparent from the following description, drawing and claims.

BRIEF DESCRIPTION OF THE DRAWINGS

The FIGURE is a longitudinal cross section with portions in elevation of a connector in accordance with the present invention.

DESCRIPTION OF THE PREFERRED EMBODIMENTS

The principles of the present invention are particularly useful in an appliance or device having a pin-shaped part 1, which is inserted into a socket-shaped part 2 to form a plug connection. The pin-shaped part 1 extends through a bore or opening 12 in a stationary wall 5 and is held in a front position by a helical compression spring 7 which surrounds the part 1. The spring 7 has one end bearing against a front collar or shoulder 3 of the part 1 and has its other end pressing against a ring 6, which is held against the wall 5 and has a larger diameter than the bore 12. The pin-shaped part 1, which extends through a bore of the ring, is thereby protected against falling out in an axial direction by an additional collar or shoulder 4, which has a larger diameter than the bore 12 of the wall 5.

Both the socket-shaped part 2 and the pin-shaped part 1 have conical end sections 8 and 8'. The bore of the socket part 2 has an additional tapering intermediate section 9, which has less of a taper or slant in comparison to the conical end section 8 and this section 9 extends between the end section 8 and a cylindrical bore 15 of the socket-shaped part 2.

The part 1 has an axis 11 and a cylindrical section or portion 18. In addition to the cylindrical section or bores 15, the part 2 has an axis 10.

When the parts 1 and 2 are urged together and have a radial offset of their axes 10 and 11, then a slanted position of the part 1 relative to the part 2 initially will occur, as shown in the Figure.

What is hereby assured by the division of the play is that the play always exists between the inside diameter 6a of the bore through the ring 6 and the outside diameter 1a of the part 1 at the beginning when the two parts 1 and 2 are plugged into one another and no static or, respectively, sliding friction between the ring 6 and the wall 5 must be overcome in the first movement of the plugging operation.

Given further introduction of part 1 into part 2, the pin-shaped part 1 has an edge 16, which is between the conical section 8' of the part 1 and the cylindrical section 18 pressing against intermediate section 9 of the part 2. Moreover, an edge 17, which is present between the section 8 and section 9 of part 2 acts on the cylindrical section 18 of the pin-shaped part 1. What therefore occurs is a lever action between attack points, such as 13 and 14, which result in a directed force which overcomes a frictional effect between the ring 6 and the wall 5 and brings the axis 10 of the part 2 into coincidence with the axis 11 of part 1. An insertion of section 18 into section 15 is now possible without any problems.

A further expedient application of the innovation could provide a light waveguide plug appliance to be utilized in a common housing in combination with electrical plug connectors.

Although various minor modifications may be suggested by those versed in the art, it should be understood that we wish to embody within the scope of the patent granted hereon all such modifications as reasonably and properly come within the scope of our contribution to the art.

We claim:

1. In a device containing at least one light waveguide plug connector, said plug connector having a pin-shaped part received in a socket-shaped part, said connector having at least one of the two parts being mounted on a wall member with radial movement relative to the wall member and means for axially biasing the two parts together, said two parts having cylindrical sections mated to one another during a plugging-in operation, the improvement comprising the socket-shaped part having an intermediate tapering section between a front conical section and the cylindrical section and the intermediate tapering section being provided with less taper than the front conical section.

2. In a device acording to claim 1, wherein the intermediate section has a slant of less than 1° relative to an axis of the socket-shaped part.

3. In a device according to claim 1, wherein said parts are composed of a hard material selected from a group consisting of hard metal, ceramics and materials having similar material properties.

4. In a device according to claim 1, wherein at least one plug connector is arranged in a common mount together with at least one electrical plug connector.

5. In a device according to claim 1, wherein said one part extends through a bore in the wall member, said bore having a diameter greater than the outside diameter of said one part, said means for axially biasing the two parts together including a spring surrounding said one part and having one end acting on said wall member and another end acting on a shoulder provided on said one part.

6. In a device according to claim 5, wherein the intermediate tapering section has a slant of less than 1° to the axis of said socket-shaped part.

7. In a device according to claim 5, wherein said one part is received in a bore of a ring, which bore has a diameter less than the bore in the wall member, said ring being mounted in a recess on a surface of said wall member, said recess being greater than the diameter of said ring so that the ring can move in the recess relative to the wall member.

8. In a device according to claim 1, wherein said pin-shaped part is mounted in a wall member by means providing a radial play, said means for providing a radial play including a ring having a bore, said pin-shaped part extending through the bore of said ring with clearance, the wall member having an opening greater than the diameter of the bore of the ring, and having a recess surrounding the opening for receiving the ring, said recess having a diameter greater than the outer diameter of said ring so that the ring is movable relative to the wall member and the pin-shaped part is movable relative to the ring with the play between the wall member and pin-shaped part being proportioned with one-half of the play being between the pin-shaped part and ring and a second half being between the wall member and ring.

9. In a device according to claim 8, wherein the means for axially biasing includes a spring surrounding the pin-shaped part with one end acting on the ring and the other end acting on a first shoulder provided on said pin-shaped part, said pin-shaped part having a second shoulder spaced from the first shoulder to prevent said spring from pulling the pin-shaped part completely through the opening in said wall member.

10. In a device containing at least one light waveguide plug connector, said plug connector having a pin-shaped part received in a socket-shaped part, said connector having at least one of the two parts being mounted on a wall member with radial movement relative to the wall members and means for axially biasing the two parts together, said two parts having cylindrical sections mated to one another during a plugging-in operation, the improvement comprising said pin-shaped part having a front conical end section, said socket-shaped part having a front conical section, and only the socket-shaped part having an intermediate tapering section between said front conical section and the cylindrical section, said intermediate tapering section being provided with less taper than the front conical section.

11. In a device according to claim 10, wherein the intermeidate section has a slant of less than 1° relative to an axis of the socket-shaped part.

* * * * *